Patented Apr. 24, 1951

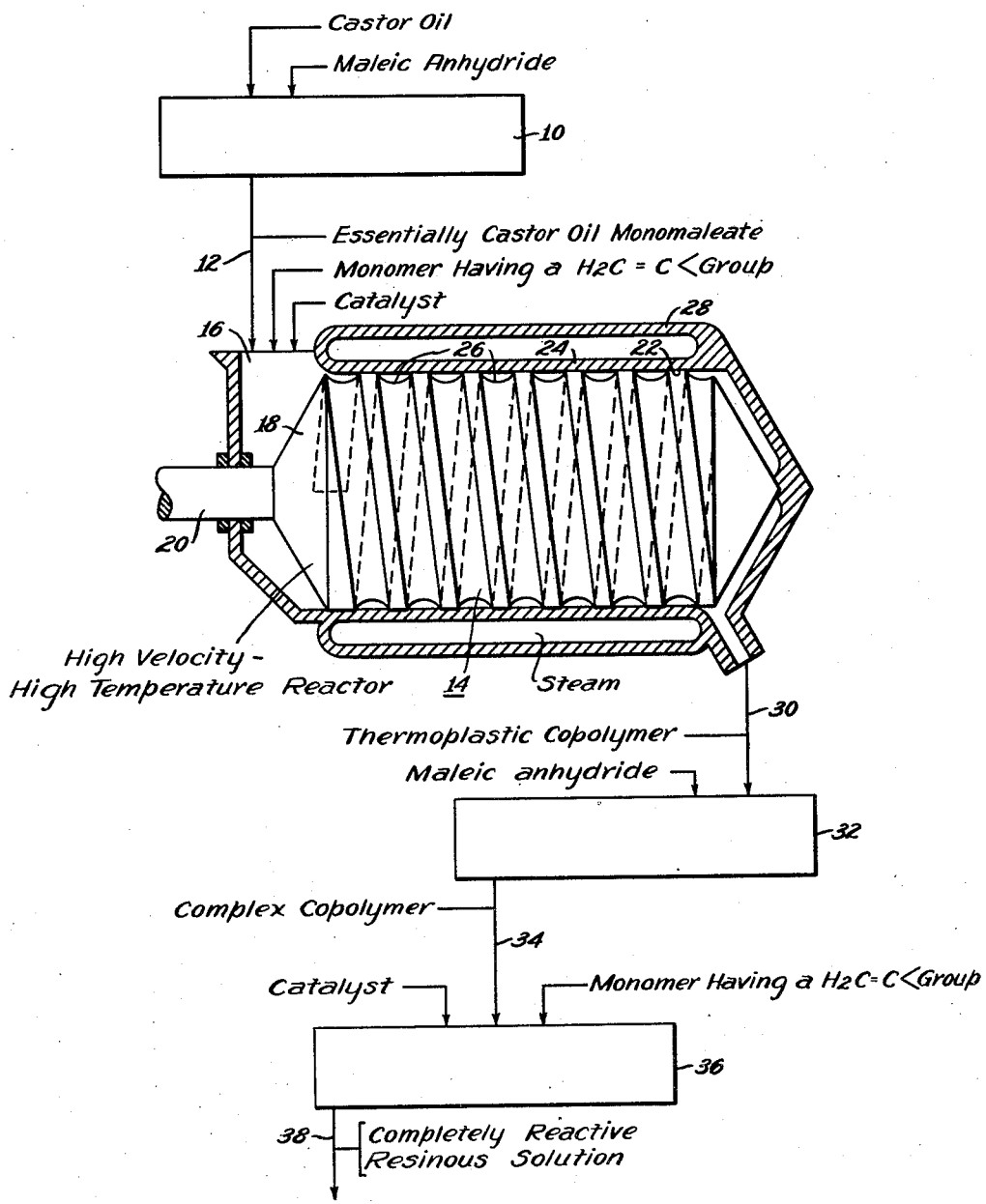

2,550,114

UNITED STATES PATENT OFFICE 2,550,114

RESINOUS COPOLYMERS OF CASTOR OIL-UNSATURATED DICARBOXYLIC ACID REACTION PRODUCTS AND POLYMERIZABLE VINYL COMPOUNDS

Newton C. Foster, Pittsburgh, Pa., assignors to Westinghouse Electric Corporation, East Pittsburgh, Pa., a corporation of Pennsylvania Application June 2, 1947, Serial No. 751,722

6 Claims. (Cl. 260—22)

This invention relates to resinous compositions and, in particular, to thermosettable resinous compositions characterized to flexibility, low shrinkage on curing and good adherence to metal.

One of the prime drawbacks of completely reactive polyester type compositions is their high shrinkage on polymerizing, the shrinkage often being 14% of the original volume, and higher.

The object of this invention is to provide for reacting acid esters of castor oil with unsaturated dicarboxylic acids in two stages, the first stage providing a thermoplastic resin and the final stage providing a thermoset resin having low shrinkage and other desirable properties.

A further object of this invention is to provide for a solvent reactive resinous composition in which one component has been previously reacted to a thermoplastic state thereby enabling the preparation of flexible resins having low shrinkage.

Other objects of the invention will in part be obvious and will in part appear hereinafter. For a fuller understanding of the nature and objects of the invention, reference should be had to the single figure of the drawing illustrating schematically the preparation of the compositions of this invention.

The present invention is directed to a two-stage reaction in which the product of the first stage is a thermoplastic resinous polymer that is further reacted with additional components to produce a solvent reactive thermoset composition. A number of advantages of the composition and the method by which it is produced will be apparent.

Referring to the drawing, there is shown schematically a reaction vessel 10 in which castor oil is reacted with an olefinic alpha, beta dicarboxylic anhydride or acid, maleic anhydride being specifically indicated. Other examples of such olefinic acids and anhydrides are fumaric acid, citraconic acid, citraconic anhydride and chloromaleic anhydride. Hereafter maleic anhydride will be specifically mentioned, but it will be understood other unsaturated dicarboxylic acids and anhydrides may be used in a similar way. Sufficient maleic anhydride should be employed to esterify an average of about only one hydroxyl group of the three hydroxyl groups in the castor oil molecule in order to avoid premature cross-linking in the first stage reaction. One mole of castor oil to approximately one mole of maleic anhydride is therefore reacted. It will be appreciated that a small amount of the castor oil dimaleic and a smaller proportion of castor trimaleate may be formed, but the preponderant product is castor oil monomaleate. A small amount of unreacted castor oil may be present; however, it is not detrimental. For this reason, it has been found that an excess of castor oil in the reaction vessel 10 assures the preferential formation of castor oil monomaleate 12. However, no substantial excess of the maleic anhydride over an equimolar ratio to castor oil is desirable. Reaction is carried out at from 70° C. to 150° C. for from 8 to 1 hours, the longer times being required at lower temperatures.

Thereafter, 100 parts by weight of the castor oil monomaleate 12 is admixed with from 20 to 200 parts by weight of a liquid polymerizable monomer having a single $H_2C=C<$ group. The monomer should have only one $H_2C=C<$ group in order that reactions therewith favor forming of non-gelling compounds. Also, a substantial amount, of the order of 3%, of a vinyl type catalyst is added; 3% of benzoyl peroxide has been found to give good results. Examples of other suitable catalysts for this purpose are tertbutyl perbenzoate, ascaridole and lauryl peroxide. Examples of suitable liquid monomers having a single $H_2C=C<$ group are monostyrene, distyrene, vinyl acetate, paramethyl styrene, methyl vinyl ketone, acrylonitrile, methyl methacrylate, ethyl acrylate and allyl esters such as allyl benzoate.

The mixture of castor oil monomaleate, monomer and catalyst reuires rapid reaction favoring formation of many relatively small polymer molecules, to attain a thermoplastic liquid state and is followed by rapid cooling to prevent gelation or other undesirable side reactions. Therefore, the mixture is preferably passed through a high temperature short time reactor 14.

The reaction in the reactor 14 is so conducted that short chain, linear-type polymers 30 are preferentially produced. Gels which may arise from polyfunctional polymerization cannot be processed subsequently satisfactorily for the purpose of this invention. Therefore, the amount of catalyst and the reaction temperature are both relatively high. From 2% to 5% of catalyst will be required.

It has been found that the inclusion of chain transfer catalysts such, for example, as dichlorohydroquinone, tetrachlorobenzoquinone (commonly known as chloranil), and dichlorobenzoquinone, in combination with a peroxide catalyst is advantageous. Thus from 0.1% to 3% of a chain transfer catalyst such as chloranil has given good results in this reaction. A decrease in the amount of the peroxide catalyst may be effected if 1% or over of the chloranil is employed. However, at least 0.1% of peroxide catalyst is required. Thus, 1% of benzoyl peroxide and 1% of chloranil will give good results.

The reactor 14 comprises an inlet 16 for receiving the components to be reacted which leads to a screw type impeller 18 driven by the shaft 20. The impeller 18 rides on lands 22 scraping against the confining walls 24. The reactants being processed are advanced by the shallow spiral grooving 26 of the impeller 18 which forces the layers of the reactants to make close contact with the walls 24 and, this, combined with the scraping action of the lands 22, thoroughly mixes and maintains uniform treatment of the reactants. The walls 24 are provided with a heating jacket 28 in which steam or hot oil or other medium may be introduced to maintain a predetermined wall temperature. The rate of revolution of the impeller 18, the temperature of the walls 24 as well as their length are selected to secure the particular degree and time of reaction desired. Ordinarily, only a few minutes in the reactor is sufficient to convert the components into a balsam-like, thermoplastic copolymer composition 30. The thermoplastic copolymer 30 is cooled immediately after having been passed through the reactor 14 to prevent any further reaction.

The thermoplastic copolymer 30 is admixed in the reaction vessel 32 with additional maleic anhydride and the maleic anhydride is caused to react to a complex ester by reaction with the remaining unreacted hydroxyl groups of the castor oil. It has been found desirable to esterify an average of at least half of the remaining hydroxyl groups. Excellent results have been obtained when the castor oil has been thus completely esterified with the maleic anhydride or other unsaturated dicarboxylic acid. The resultant complex copolymer 34 is then admixed with from 5 to 100% of its weight of a monomer having an $H_2C=C<$ group. The monomers having a single $H_2C=C<$ group previously indicated can be used as well as monomers having more than one $H_2C=C<$ group. Examples of the latter are diallyl phthalate and diallyl succinate. The mixture is combined in a mixer 36 and then a small amount of a vinyl type catalyst such as benzoyl peroxide in an amount of from about 0.1% to 1% is added thereby providing a completely reactive resinous solution 38.

Depending on the proportions employed in the previous steps of the reaction, the solution 38 may vary in consistency from a moderately heavy oil to a viscous fluid that can barely be poured. The solution may be applied as a varnish, impregnant, potting compound or encapsulation medium in this state or it may be thinned with a volatile solvent for some applications. When thinned with acetone, benzene, benzene-ethyl alcohol mixtures, or other volatile solvent, it may be employed as a varnish or for any desired coating or impregnating application. The completely reactive resinous solution may be admixed with various fibrous and solid powder fillers to impart any desired physical property. Thus asbestos fibers, glass fibers, powdered mica, silica flour, quartz sand, wood flour, asbestos paper, and pigments and dyes may be added.

The following examples illustrate the practice of the invention.

*Example I*

100 parts of castor oil were reacted with 5 parts by weight of maleic anhydride in the closed reaction vessel 10 for 5 hours at a temperature of from 130 to 135° C. The resulting ester product was admixed with monostyrene in the ratio of 3 parts of the product to 2 parts of monostyrene. Benzoyl peroxide was added in the proportion of 3% of the total weight. The mixture was passed through the reactor 14 heated to a temperature 135° C. The reactants were maintained in contact with the heated reactor for approximately 10 minutes and were immediately cooled to room temperature. The product 30 was a copolymer resin of a heavy balsam-like consistency.

Thereafter 2.86 parts by weight of maleic anhydride and 0.025 part of quinhydrone as an inhibitor (other inhibitors such as benzaldehyde, tannin or resorcinol may be employed) were added to each 100 parts by weight of the resin and the whole reacted in a closed reaction vessel 32 for 4 hours at 130° C. with stirring. After cooling, 22.8 parts of monostyrene and 0.37 part of benzoyl peroxide were thoroughly admixed therewith in the mixer 36. The solution 38 so prepared would react to a tough, flexible but infusible and insoluble resinous body after heating to a temperature of 135° C. for several hours. By dissolving the solution 38 in acetone in the proportion of 60 parts of the solution to 40 parts of acetone, a thin varnish was obtained. Aluminum foil 10 mils thick dipped in the varnish was dried to evaporate the acetone and the resulting coating baked at 150° C. for 15 minutes. The aluminum foil could be bent double upon itself without cracking the tightly adherent and flexible resinous coatings. Even after baking for 12 hours at 200° C., the aluminum foil could be bent about a ⅛ inch mandrel without the coating cracking. By comparison, a high grade baking varnish applied to a similar foil would crack on being bent over the ⅛ inch diameter mandrel after three hours at 200° C.

*Example II*

100 parts by weight of the balsam-like resin 30 produced by the reactor 14 in Example I was admixed with 14.28 parts of maleic anhydride and reacted for 4 hours at 135° C. The resulting complex copolymer 34 was admixed with 37.14 parts by weight of monostyrene and 0.76 part of benzoyl peroxide. The resulting completely reactive solution 38 formed a hard thermoset resin after baking several hours at 135° C. It adhered strongly to glass and metal. Acetone diluted coatings of the resin when baked at 135° C. for several hours formed hard scratch resistant films which were somewhat less flexible, though much harder, than the final composition of Example I.

The completely reacted resinous solution of Example II was diluted with acetone in the proportion of 60 parts of the resinous solution to 40 parts of acetone. Mica flakes laid on a sheet of cellophane were painted with the resin solution and built up into a sheet approximately 20 mils thick. The acetone was removed by flash drying in a vacuum oven and the sheet was rolled flat, trimmed, and the cellophane removed. The mica sheet could be conveniently handled and was suitable for use as a flexible tape or ribbon. It could be formed by light pressure into any desirable shape, such, for example, as a V-ring. After forming into shape, it was baked for from 10 to 20 minutes at 130° C. The resulting product was a rigid permanently set mica plate. It was free of any gas pockets or bubbles. Upon tests with alternating current, it exhibited the following power factor at room temperature.

| Frequency | Power Factor |
|---|---|
| | Per cent |
| 60 | 1.8 |
| 100 | 1.86 |
| 1 Kc | 1.36 |
| 100 Kc | 1.1 |

With larger proportions of monostyrene in the final solution, the power factor could be reduced considerably more to a value of below 0.5%.

The completely reactive resinous solution of Examples I and II may be applied as a potting compound for transformers, cables, and other electrical members. Coils for generators can be treated with the compound. In all these structures the solution set to a solid resinous body with very little shrinkage and substantially no formation of bubbles, cracks or other undesirable voids. The shrinkage may be less than 2%.

The reactor 14 illustrated in the drawing is only one form of suitable apparatus for the purpose of the invention. As an example of an alternative form of reactor there may be employed an enclosed heated cylinder on which the reactants may be applied in thin films and scraped off after reaction. Other forms of reactors may be employed.

Numerous other uses of the invention will be obvious to those skilled in the art, and it is desired that the specification and drawing be interpreted as illustrative and not in a limiting sense.

I claim as my invention:

1. The resinous copolymer derived by reacting 100 parts by weight of the acid castor oil monomaleate half ester with from 25 to 200 parts by weight of monostyrene to provide a balsam-like fluid, then reacting the fluid with sufficient maleic anhydride to esterify at least half the remaining unreacted hydroxyl groups in the castor oil, and lastly reacting the resulting product with from 5% to 100% of its weight of monostyrene.

2. Insulating material comprising mica flakes and a binder, the binder comprising the resinous copolymer derived by reacting 100 parts by weight of the acid castor oil monomaleate half ester with from 25 to 200 parts by weight of monostyrene to provide a balsam-like fluid, then reacting the fluid with sufficient maleic anhydride to esterify at least half the remaining unreacted hydroxyl groups in the castor oil, and lastly reacting the resulting product with from 5% to 100% of its weight of monostyrene.

3. In the method of preparing a resinous composition, the steps comprising reacting substantially equimolar proportions of castor oil and an acidic compound selected from the group consisting of maleic anhydride, fumaric acid, maleic acid, citraconic acid, citraconic anhydride and chloromaleic anhydride to produce the acid castor oil monoester, admixing 100 parts by weight of the monoester, from 25 to 200 parts by weight of a liquid polymerizable monomer having a single $H_2C=C<$ group and an organic peroxide polymerization catalyst in an amount of from 2% to 5% of the weight of the reactants, heating the mixture for a period of time to produce a fluid copolymer, thereafter admixing and reacting the fluid copolymer with an additional amount of the first-mentioned acidic compound to esterify the unreacted hydroxyl groups of the castor oil component of the copolymer, and finally adding to the resulting reaction product a liquid polymerizable monomer in an amount of from 5% to 100% of the reaction product.

4. In the method of preparing a resinous composition, the steps comprising admixing 100 parts by weight of the acid castor oil monoester of an acidic compound selected from the group consisting of fumaric acid, maleic anhydride, maleic acid, citraconic acid, citraconic anhydride, and chloromaleic anhydride, from 25 to 200 parts by weikht of a liquid polymerizable monomer having a single $H_2C=C<$ group and an organic peroxide polymerization catalyst in an amount of from 2% to 5% of the weight of the reactants, heating the mixture for a period of time to produce a fluid copolymer, thereafter admixing and reacting the fluid copolymer with an additional amount of the first-mentioned acidic compound to esterify the unreacted hydroxyl groups of the castor oil component of the copolymer, and finally adding to the resulting reaction product a liquid polymerizable monomer in an amount of from 5% to 100% of the reaction product.

5. The resinous composition derived by reacting to a fluid state 100 parts by weight of the acid castor oil monoester of an acidic compound selected from the group consisting of fumaric acid, maleic anhydride, maleic acid, citraconic acid, citraconic anhydride and chloromaleic anhydride, from 25 to 200 parts by weight of a liquid polymerizable monomer having a single $H_2C=C<$ group and from 2% to 5%, based on the weight of the reactants, of an organic peroxide polymerization catalyst, and then reacting the resulting reaction product with an additional amount of the first-mentioned acidic compound to esterify at least half of the remaining hydroxyl groups in the castor oil monoester.

6. The resinous composition derived by reacting to a fluid state 100 parts by weight of the acid castor oil monoester of an acidic compound selected from the group consisting of fumaric acid, maleic anhydride, maleic acid, citraconic acid, citraconic anhydride and chloromaleic anhydride, from 25 to 200 parts by weight of a liquid polymerizable monomer having a single $H_2C=C<$ group and from 2% to 5%, based on the weight of the reactants, of an organic peroxide polymerization catalyst, then reacting the resulting reaction product with an additional amount of the first-mentioned acidic compound to esterify at least half of the remaining hydroxyl groups in the castor oil monoester, and lastly reacting the resulting ester product with from 5% to 100% of its weight of a liquid polymerizable monomer having an $H_2C=C<$ group.

NEWTON C. FOSTER.

REFERENCES CITED

The following references are of record in the file of this patent:

UNITED STATES PATENTS

| Number | Name | Date |
|---|---|---|
| 2,439,953 | Swiss et al. | Apr. 20, 1948 |
| 2,457,661 | Grosser | Dec. 28, 1948 |
| 2,462,209 | Minter | Feb. 22, 1949 |